Aug. 13, 1968  H. C. EDWARDS  3,397,020
SINGLE ROW TAPERED ROLLER BEARING
Filed Feb. 16, 1966
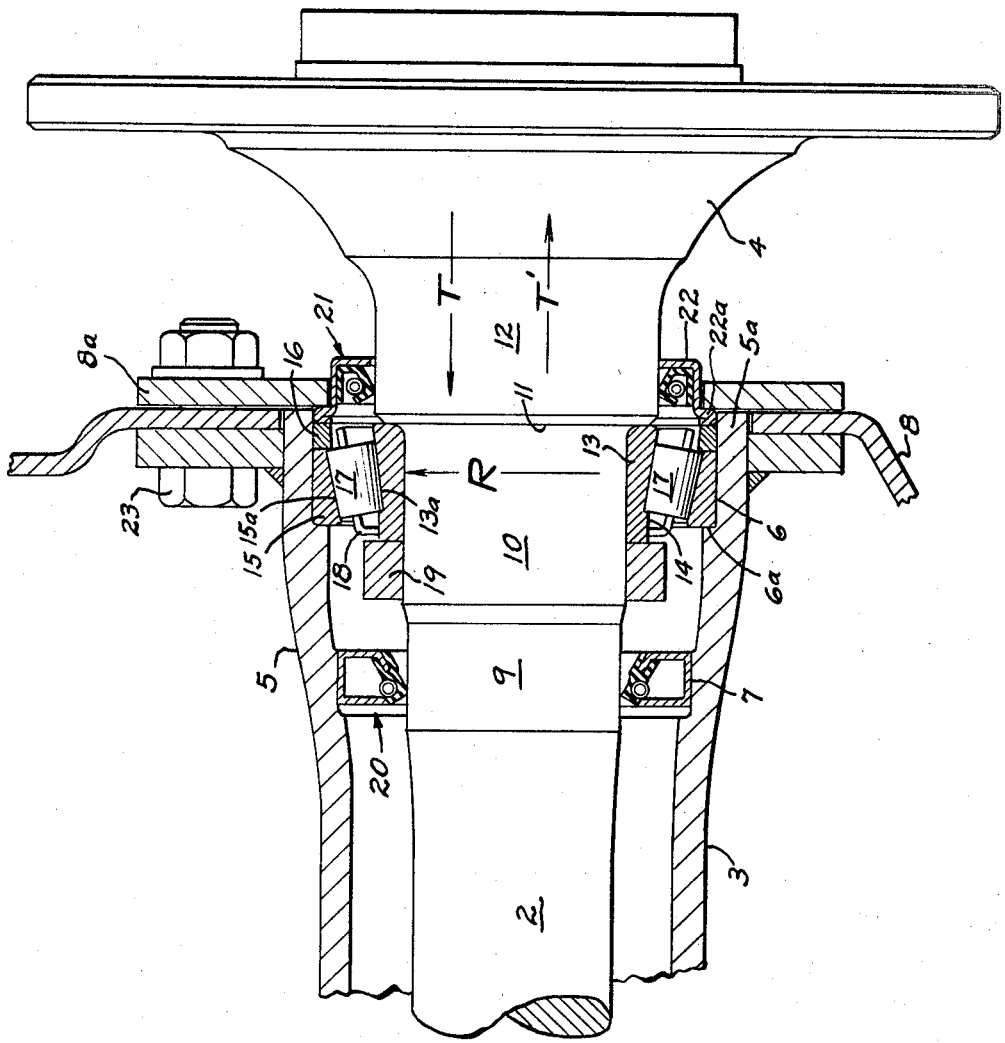
INVENTOR
HERBERT C. EDWARDS
By Gravely, Lieder & Woodruff
ATTORNEYS

United States Patent Office 3,397,020
Patented Aug. 13, 1968

3,397,020
SINGLE ROW TAPERED ROLLER BEARING
Herbert C. Edwards, Canal Fulton, Ohio, assignor to The Timken Roller Bearing Company, Canton, Ohio, a corporation of Ohio
Filed Feb. 16, 1966, Ser. No. 527,979
1 Claim. (Cl. 308—207)

ABSTRACT OF THE DISCLOSURE

A single row tapered roller bearing having an organization of parts that will permit obtaining the maximum number of tapered rollers between the cone and the cup and will permit the obtaining of much closer tolerances and withstand greater thrust in the direction seating the rollers on the respective raceways through a novel, separately formed thrust rib associated with the cup.

---

This invention relates to roller bearings and particularly to improvements in tapered roller bearings for sustaining radial loading as well as thrust loading in both directions of thrust.

It is an important object of this invention to provide a roller bearing having an organization of parts and components such that improved tolerance control will permit sustaining greater thrust loads.

It is also an important object of this invention to provide a roller bearing for shaft mounting that will substantially eliminate the need for the usual adjustment devices.

Another object of this invention is to provide a roller bearing for supporting vehicle semi-floating flanged axles in such manner that the usual center thrust devices can be omitted without reducing the ability of the roller bearing to withstand the thrust loads.

Another object of this invention is to provide a roller bearing assembly having a separate preassembled unit of cone, tapered rollers and roller cage, and to combine therewith a cup and separate thrust rib, whereby close tolerances may be obtained to afford correct radial and axial clearances without adjusting expedients.

The invention also consists in a roller bearing providing large thrust capacity, close tolerance manufacture, avoidance of adjustment means, and a roller bearing consisting in the parts, components, and arrangement of parts hereinafter set forth.

A presently preferred embodiment of the invention will be described, reference being made to the accompanying drawing, wherein the single view FIG. 1 is a longitudinal sectional view of a fragmentary part of vehicle semi-floating flanged axle in which the roller bearing assembly has been incorporated.

In the drawing, the axle 2 is enclosed in an axle housing 3 with its outer flanged end 4 projecting therefrom. The housing 3 has a flared end portion 5 whose bore is counterbored at 6 for a bearing seat and further counterbored at 7 for a seal seat. The flared end portion 5 of the housing is suitably connected to a part 8 of the vehicle structure. The portion of the axle 2 within the flared end 5 of the housing is provided with a first cylindrical land 9, outwardly thereof is a second cylindrical land 10 which is adjacent a shoulder 11, and finally there is a third cylindrical land 12 located at the outer end 5a of the housing flared portion 5.

The axle 2 is mounted in the housing 3 by a single row tapered roller bearing assembly which sustains the radial loads represented by arrow R, the heavy thrust loads represented by arrow T imposed by the vehicle cornering or by severe impact loads from striking objects, and the lighter thrust loads represented by the arrow T'. The bearing assembly itself includes the inner race or cone 13 formed with an external tapered roller surface 13a and an integral rib 14, an outer race or cup 15 having an internal tapered roller surface 15a, and a separately formed large diameter rib 16. A set of tapered rollers 17 is disposed between the roller surfaces of the cone 13 and cup 15, and the rollers 17 are spaced and retained by a cage structure 18. In the assembly thus identified the cone 13 has its integral rib 14 at the small diameter end of the roller contact surface 13a and the cage structure 18 spacedly retains the set of rollers 17 on the cone 13 with the small diameter ends thereof positioned adjacent the rib 14. The cone 13, rollers 17 and cage 18 together forms a unit which is preassembled.

In the assembly shown, the cone 13 is mounted on the land 10 in abutment with shoulder 11 on the axle 2, and a retainer ring 19 is fitted against the cone 13 adjacent rib 14 and on land 10. The cup 15 is fitted in the housing counterbore 6 against shoulder 6a, and the rib 16 is fitted into the open end portion 5a of the housing 3. The rib 16 thereby abuts the large diameter ends of the rollers 17 and locates the small diameter ends of rollers 17 adjacent the small rib 14. Inwardly the bearing assembly there is a seal 20 between the axle land 9 and the counterbore 7 in the axle housing. The outer end 5a of the housing 3 is closed by a seal 21, including a seal case 22 in which the case flange 22a is held against the rib 16 by the member 8a which is positioned by a set of securing means 23. In placing the roller bearing assembly in its operating position, the thrust rib 16 will function as an integral part when mechanically held by being fitted into the counterbore 6 and retained by the seal case flange 22a. Alternatively the rib 16 may be secured to the end face of the cup 15 so that the bearing is first mounted on the axle and the axle 2 is then moved into the housing 3.

The manufacture of the improved roller bearing can be achieved with very close tolerances as the rib 16 is a separate part, thereby allowing the rollers 17 to be closely set adjacent rib 14 and backed up by the rib 16. Thus the rollers can be initially adjusted between the ribs 14 and 16 for correct functioning. An important advantage of this feature is that thrust loads are taken in either direction without the use of adjusting devices. As a result this bearing can replace two conventional single row tapered roller bearings which are needed to take the thrust in opposite directions. Furthermore, an advantage of the present improved bearing is that it is possible to select overall tolerances for the bearing parts so that the radial and axial clearances when installed will be correct for proper functioning. In view of this the bearing will sustain greater thrust loads in the direction to seat the bearings against the tapered roller surfaces than in the opposite direction where the bearings are against the cone and cup ribs.

What is claimed is:
1. In combination, an axle having a cylindrical land with a shoulder at one end, an axle housing spaced from said axle and having an open end adjacent said axle shoulder and a counterbore therein, and a single antifriction bearing assembly carried by and supporting said axle within said housing, said bearing including an inner bearing cone retained on said cylindrical land with one end abutting said shoulder, said cone having an external conical roller surface and rib means only at the small diameter end remote from said axle shoulder, a single row of tapered rollers on said external conical roller surface, cage means engaged with said tapered rollers, an outer bearing cup positioned in said housing counterbore, said bearing cup having an internal conical roller surface engaged on said tapered rollers, the large diameter ends of said tapered rollers being adjacent the open end of said housing, a separate rib member receivable in said housing open end and secured to the end face of said bearing cup and extending radially inwardly of the large diameter ends of said tapered rollers, said rib member positioning the small diameter ends of said tapered rollers adjacent said rib means on said bearing cone and a separate lubricant seal means secured in said counterbore and engaging said axle.

References Cited
UNITED STATES PATENTS

| | | | |
|---|---|---|---|
| 1,949,824 | 3/1934 | Buckwater | 308—214 |
| 2,641,518 | 6/1953 | Trammell | 308—187.1 |

FOREIGN PATENTS 680,978  10/1952  Great Britain.

MARTIN P. SCHWADRON, *Primary Examiner.*

FRANK SUSKO, *Assistant Examiner.*